United States Patent
Bonin et al.

[11] Patent Number: 5,915,831
[45] Date of Patent: Jun. 29, 1999

[54] INTERNAL AIM HEADLAMP ASSEMBLY

[75] Inventors: Jason Bonin, Foxboro; Chris Morewood, Colborne; Wayne White, Frankford, all of Canada

[73] Assignee: Autosystems Manufacturing, Inc., Belleville, Canada

[21] Appl. No.: 08/740,926

[22] Filed: Nov. 5, 1996

[51] Int. Cl.[6] ...................................................... B60Q 1/04
[52] U.S. Cl. ........................ 362/519; 362/546; 362/523; 362/463; 362/515; 362/528; 362/548
[58] Field of Search .................................... 362/460, 512, 362/514, 519, 546, 523, 463, 515, 528, 529, 548, 285

[56] References Cited

U.S. PATENT DOCUMENTS

| | | |
|---|---|---|
| 4,412,275 | 10/1983 | McMahan et al. . |
| 4,414,614 | 11/1983 | McMahan et al. . |
| 4,479,173 | 10/1984 | Rumpakis . |
| 4,510,557 | 4/1985 | Tsuyama . |
| 4,528,619 | 7/1985 | Dolan et al. . |
| 4,569,005 | 2/1986 | Bergin et al. . |
| 4,569,006 | 2/1986 | Bergin et al. . |
| 4,590,542 | 5/1986 | Schauwecker ........................... 362/548 |
| 4,620,268 | 10/1986 | Ferenc . |
| 4,623,958 | 11/1986 | Van der Linde et al. . |
| 4,811,174 | 3/1989 | Kanzler et al. . |
| 4,930,050 | 5/1990 | Poizner . |
| 5,010,455 | 4/1991 | Luallin ................................... 362/548 |
| 5,021,930 | 6/1991 | Yamada . |
| 5,113,320 | 5/1992 | Haydu . |
| 5,119,276 | 6/1992 | Suzuki . |
| 5,146,392 | 9/1992 | Kasboske . |
| 5,205,633 | 4/1993 | Kasboske . |
| 5,211,465 | 5/1993 | Suzuki . |
| 5,365,414 | 11/1994 | Chikada et al. . |
| 5,394,310 | 2/1995 | Iwasaki ................................... 362/546 |
| 5,428,510 | 6/1995 | Shirai et al. . |
| 5,500,790 | 3/1996 | Chikada et al. . |
| 5,506,759 | 4/1996 | Shirai et al. . |
| 5,743,618 | 4/1998 | Fujino ..................................... 362/519 |

*Primary Examiner*—Sandra O'Shea
*Assistant Examiner*—Marshall Honeyman
*Attorney, Agent, or Firm*—Howard & Howard

[57] ABSTRACT

A vehicle headlight assembly includes a snapping engagement between a bezel, a housing and a lens. The snapping engagement positions all three pieces relative to each other during a manufacturing or assembly process. The light bulbs of the headlamp assembly are supported on the internally aimed reflector by bulb retainers that snappingly engage openings in the reflector. The bulbs preferably include housings that bias tab members on the bulb retainers into engagement with the reflector. The reflector is moved within the housing to direct the beam of light from the bulbs. Socket retainers snappingly engage the reflector. Ball members on conventional adjustors are received within the socket retainers so that the adjustors support the reflector within the housing and provide the ability to adjust the angular position of the bulbs and reflector relative to the remainder of the assembly.

12 Claims, 5 Drawing Sheets

INTERNAL AIM HEADLAMP ASSEMBLY

BACKGROUND OF THE INVENTION

This invention relates to a lighting assembly for use as vehicle headlamps.

A variety of vehicle headlamp assemblies are in use or have been proposed. Regardless of what type of headlamp assembly is used, it is necessary to properly aim the headlights to direct the light from the headlights in a specific direction from the vehicle. Proper aim of a headlight ensures that a driver is provided with the optimum lighting conditions while driving.

Traditionally, headlamps were aimed through external mounting arrangements. Such arrangements typically included manipulating adjustment screws to change the position of a headlamp housing. The adjustment screws were typically within a mounting assembly that mounted the headlamp assembly to the body or frame of the vehicle. More recently, internally aimed headlamp assemblies have been introduced. Internally aimed headlamp assemblies include, for example, a housing that is fixedly mounted relative to the frame of the automobile. Adjustment mechanisms are used to alter the position of a reflector and the headlight within the headlamp assembly to appropriately aim the headlight. Although internally aimed headlamp assemblies have advantages compared to externally aimed headlamps, there are also drawbacks.

A significant drawback associated with typical internally aimed headlamp assemblies is that the arrangement of components is relatively complex. Moreover, assembling an internally aimed headlamp is typically relatively complex and time-consuming. There is a need, therefore, for an internally aimed headlamp assembly that is readily and efficiently assembled.

This invention addresses the needs discussed above. Moreover, this invention overcomes the drawbacks associated with typical headlamp assemblies. This invention includes unique snapping engagements among various components of a headlamp assembly that render the manufacturing and assembly process far more economical than previously proposed assemblies.

SUMMARY OF THE INVENTION

In general terms, the invention is a light assembly for use on vehicles. The light assembly includes a housing having a rear portion and a front portion with a channel including two side walls. The channel extends along at least a portion of a peripheral edge on the front portion of the housing. A bezel is received within the housing and has a tab member that engages one of the channel side walls on the housing. A lens has a flange portion that is at least partially received within the channel and the tab member on the bezel engages the flange portion to maintain the flange portion within the channel on the housing. Accordingly, the housing, bezel and lens are all held together by the tab member on the bezel.

The tab member on the bezel is used to hold the lens, the housing and the bezel in place temporarily. An adhesive is provided within the channel on the housing that cures to form a permanent bond between the housing, bezel and lens.

A reflector is supported within the housing for movement relative to the housing, the bezel and the lens. The reflector supports the headlamp bulbs, which are mounted onto the reflector through bulb retainers. The bulb retainers include snapping engagement surfaces that facilitate easy assembly. The reflector is supported within the housing by an adjustment mechanism, which is connected to the reflector through a snapping retainer.

The various features and advantages of this invention will become apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
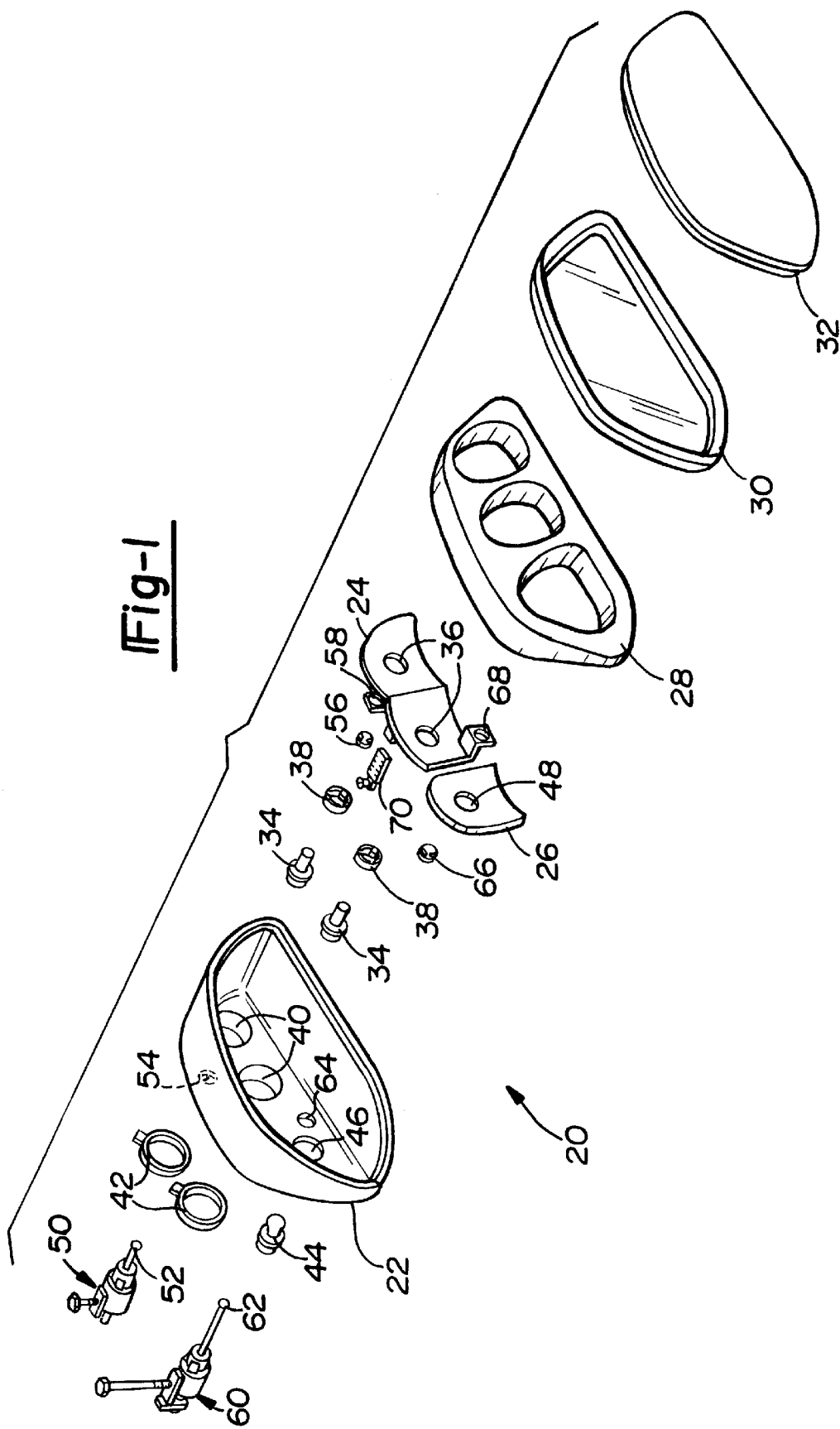
FIG. 1 is an exploded, perspective view of a headlamp assembly designed according to this invention.

FIG. 1 is an exploded, perspective view of a headlamp assembly 20. A housing 22 has a generally open front portion and a generally enclosed rear portion. A primary reflector 24 is supported within the housing 22 as will be described in more detail below. A secondary reflector 26 is also included for a turn signal light within the headlamp assembly 20. A bezel 28 is generally received within the open portion of the housing 22. A lens 30 generally covers across the open portion of the housing 22. An elastomer molded close-out seal 32 is received around the periphery of the engagement between the lens 30 and the housing 22.

In the illustrated embodiment two headlight bulbs 34 are included. The headlight bulbs 34 are received through the openings 36 in the primary reflector 24. A pair of bulb retainers 38 maintain the bulbs 34 within the openings 36 so that the bulbs 34 remain fixed relative to the primary reflector 24. Details regarding the retainers 38 will be discussed below.

A pair of openings 40 on the rear portion of the housing 22 provide access to the bulbs 34 from outside of the assembly 20. A pair of caps 42 are received on the rear portion of the housing 22 to close off the openings 40 once the assembly 20 is complete. As will be described in more detail below, the caps 42 are selectively removable to provide access to the bulbs 34.

A turn signal bulb 44 is mounted within an opening 46 on the rear portion of the housing 22. The turn signal bulb 44 also protrudes through an opening 48 on the secondary reflector 26. The secondary reflector 26 is preferably rigidly mounted within the housing 22.

The primary reflector 24 is movably mounted within the housing 22. An adjustment mechanisms includes an adjustor 50, which is a conventional linear actuator device. A shaft having a ball portion 52 extends from the adjustor 50 through an opening 54 in the rear portion of the housing 22 and is received within a ball-retaining socket 56. The ball-retaining socket 56 is snappingly engaged into an opening 58 on the primary reflector 24. Details regarding the snapping engagement between the retainer socket 56 and the opening 58 will be provided below. Similarly, an adjustor 60 includes a ball portion 62 that protrudes through an opening 64 in the rear of the housing 22. The ball portion 62 is received within a retainer socket 66 that snappingly engages the primary reflector 24 at the opening 68.

Figure 2:
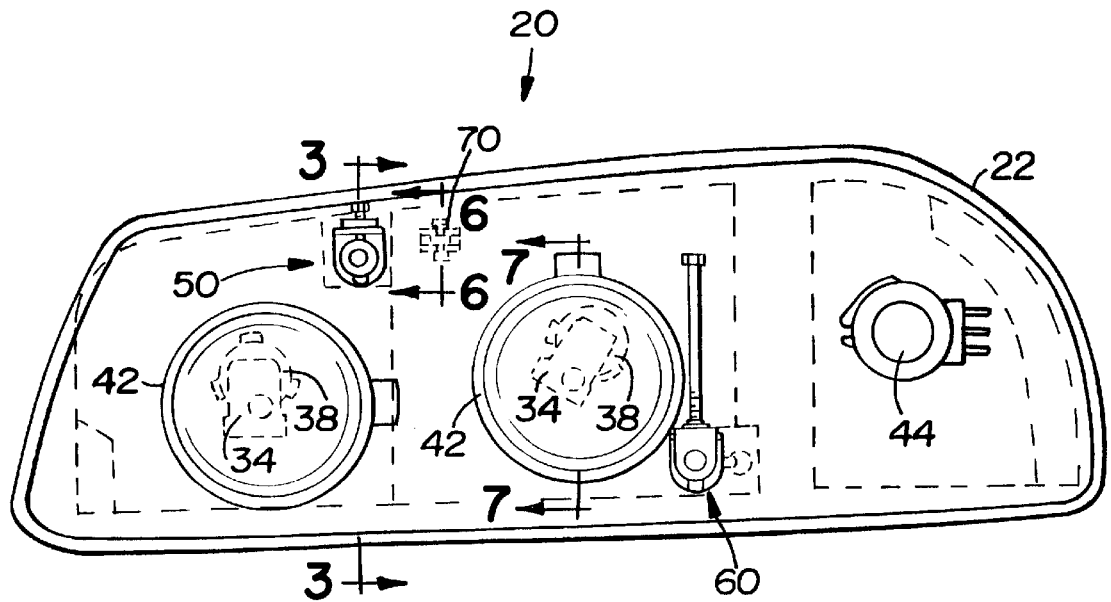
FIG. 2 is a rear elevational view of the embodiment of FIG. 1 when assembled.
Figure 3:
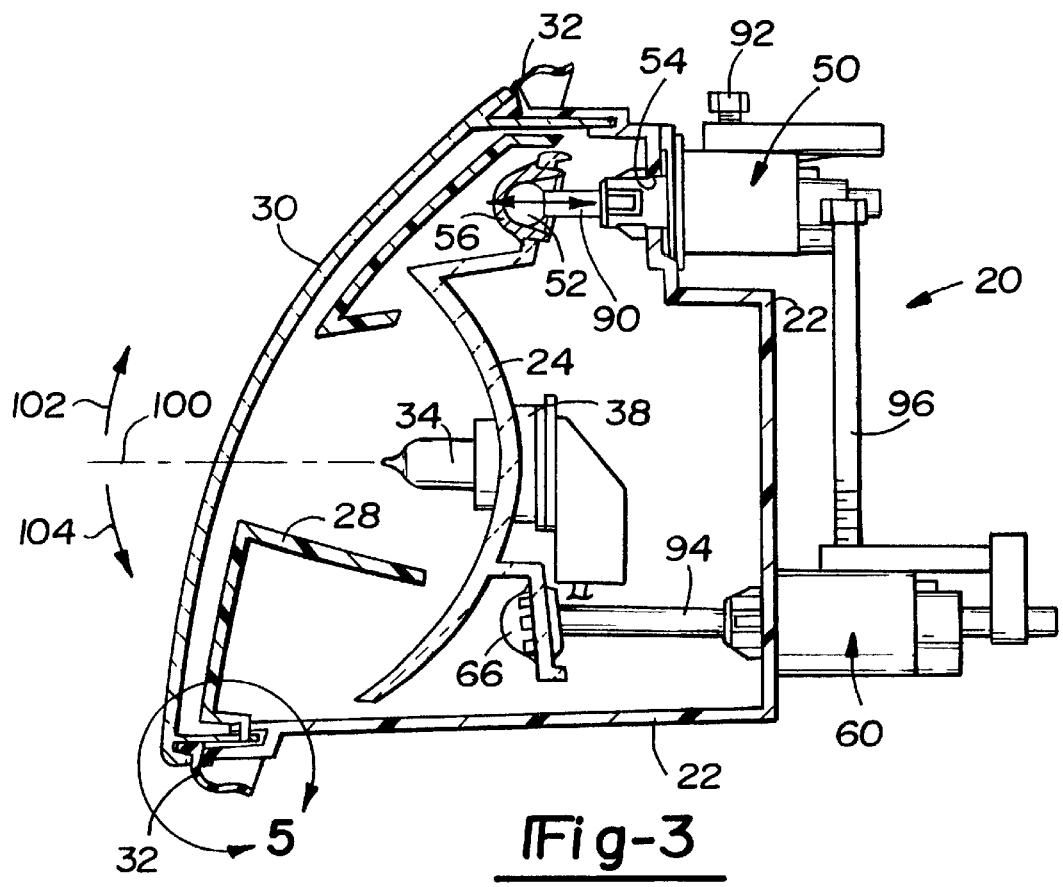
FIG. 3 is a cross-sectional view of the embodiment of FIG. 2 taken along the lines 3—3.
Figure 4:
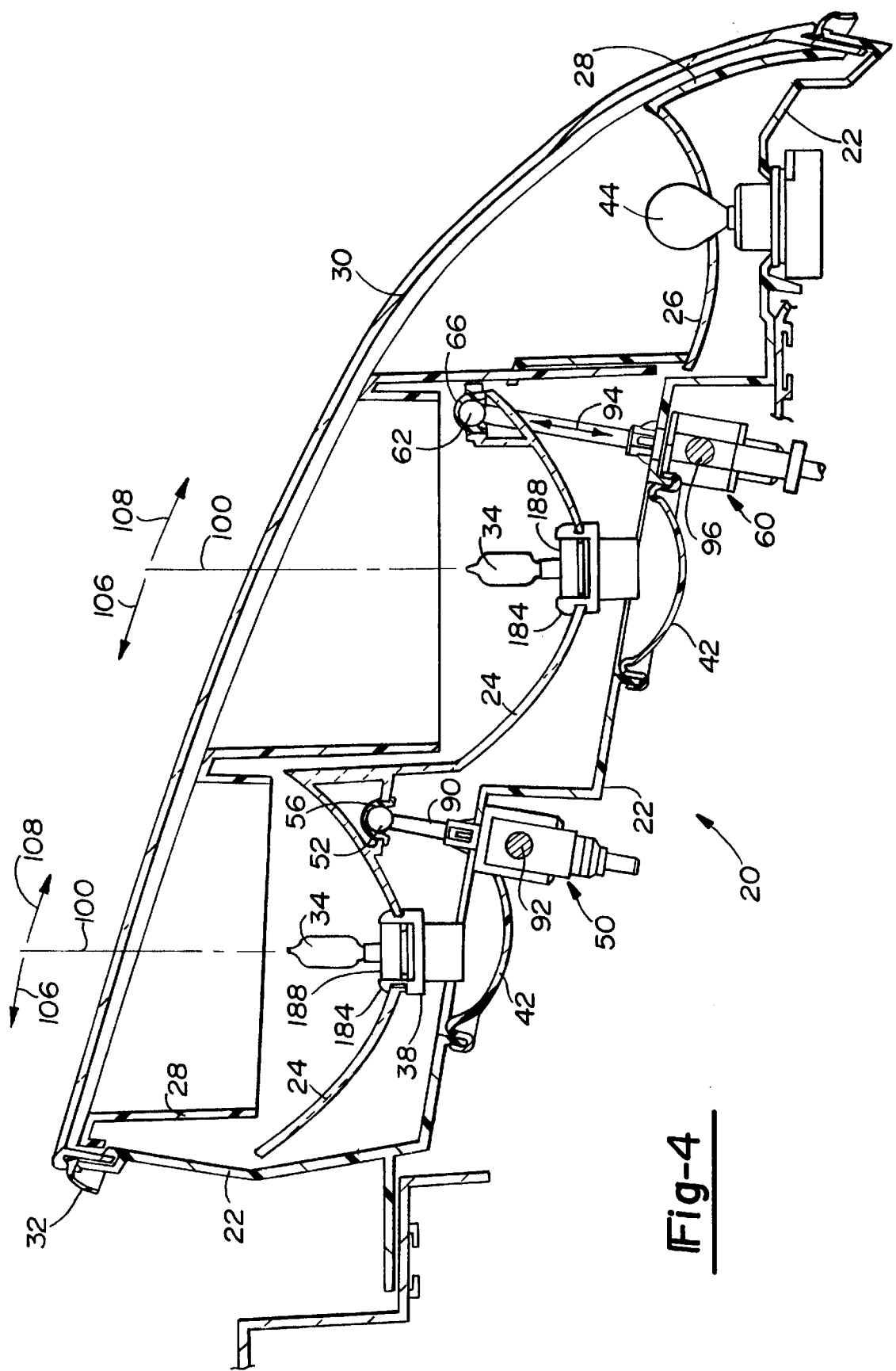
FIG. 4 is a partially cross-sectional view of the embodiment of FIG. 2 as seen from the top of the illustration of FIG. 2.

FIG. 2 illustrates the embodiment of FIG. 1 in an assembled condition as seen from the rear of the housing 22. FIG. 3 is a cross-sectional view taken along the lines 3—3 in FIG. 2. FIG. 4 is a cross-sectional view of the same embodiment as seen from the top of the illustration in FIG. 2. FIGS. 2, 3 and 4 generally illustrate the arrangement of the various components of the assembly 20 when it is in an assembled condition.

An important feature of this invention is the manner in which the assembly 20 is assembled. Specifically, a unique arrangement provides a connection between the bezel 28, the housing 22 and the lens 30. This snapping engagement is highlighted in FIG. 5. The bezel 28 includes a tab member 72 that has a protruding finger portion 73. The tab member 72 snappingly engages the housing 22 and the lens 30. Specifically, the finger portion 73 is snappingly received within an opening 74 on the housing 22 and protrudes through an opening 76 on the lens 30. During the preferred assembly procedure, the bezel 28 is moved relative to the housing 22 such that the finger member 73 rides along the ramped portion 78 on a first sidewall 80 until the finger member 73 snaps into place within the opening 74. A second sidewall 82 on the housing 22 extends generally parallel to the first sidewall 80. The first and second sidewalls 80 and 82 form a channel 83 that preferably extends around the entire periphery of the front portion of the housing 22. Curable, sealing adhesive 84 preferably is disposed within the channel on the housing 22.

After the bezel 28 is snapped into engagement with the housing 22, the lens 30 is then snapped into place. As the lens 30 is moved toward the housing 22 a flange 86 on the lens 30 is moved into the channel between the first and second sidewalls 80 and 82. The finger portion 73 rides along a ramped surface 88 on one end of the flange 86 until the finger portion snappingly engages the opening 76. At this moment, the tab member 72 on the bezel 28 maintains the bezel 28, the housing 22 and the lens 30 in a fixed position relative to each other. In the preferred embodiment, there are three tab members 72 along a bottom portion of the bezel 28 and two tab members spaced along a top portion of the bezel 28. There also are corresponding numbers of openings 74 on the housing 22 and openings 76 on the lens 30, each one for receiving a finger member 73.

Figure 5:
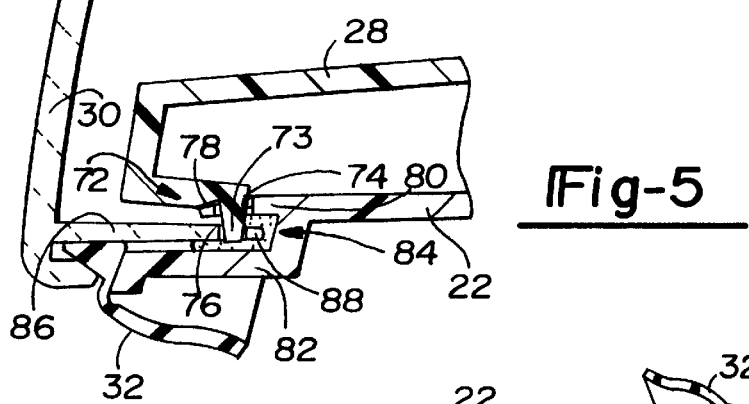
FIG. 5 is a cross-sectional illustration of a preferred engagement between several components of a headlamp assembly designed according to this invention.

The snapping engagement of the bezel 28, the housing 22 and the lens 30 preferably is used for temporarily maintaining those three portions of the assembly in a fixed position relative to each other. The curable adhesive and sealant 84 is then allowed to cure, which permanently fixes the bezel to the housing and the lens, respectively. Those skilled in the art will be able to choose from among commercially available adhesives to realize a permanent connection between the bezel, the housing and the lens that also creates a fluid-tight seal along the interface between the lens and the housing. The elastomer seal 32 preferably engages the lens 30 and the second sidewall 82 on the housing 22 as illustrated in FIG. 5. The elastomer seal provides a second fluid-tight seal around the perimeter of the connection between the lens 30 and the housing 22. In one embodiment, the elastomer seal 32 is not used and the adhesive 84 acts as a sealant for sealing off the interface between the lens and the housing. In the preferred embodiment, however, the channel formed by the two sidewalls 80 and 82 extends around the entire periphery of the housing 22 and the molded close-out seal 32 is received along the entire periphery of the housing 22 and the lens 30.

Referring again to FIGS. 3 and 4, the aim of the lights within the headlamp assembly is adjusted by moving the reflector 24 within the housing 22. It is important to note that the primary reflector 24 is movably supported within the housing 22 solely by the connections between the reflector 24 and the adjustors 50 and 60. The adjustor 50, which is a conventional linear actuator, is used to adjust the horizontal aim of the headlight. A shaft 90 extends out of the adjustor 50. An adjustment screw 92 can be manipulated (i.e., turned) to cause the shaft 90 to move in a fore and aft direction relative to the adjustor 50. As the shaft 90 moves, the ball portion 52 also moves according to the direction arrows shown in FIG. 3, for example. Since the ball portion 52 is snappingly received within the retainer socket 56, which is snappingly engaged to the reflector 24, the reflector 24 moves responsive to movement of the shaft 90 and the ball portion 52. The adjustor 50 can, therefore, be used to adjust the horizontal angle of the aim of the lamp 34. A center line 100 of the lamp aim is schematically illustrated in FIG. 3. Movement of the shaft 90 and the ball portion 52 cause the reflector 24 to move, which results in the center line 100 of the lamp aim moving according to the direction arrows 102 and 104, respectively.

Similarly, adjustor 60 includes a shaft 94 and an adjustment screw 96. Manipulation of the adjustment screw 96 causes the shaft 94 to move in a fore and aft direction relative to the adjustor 60. This motion is schematically illustrated by the direction arrows in FIG. 4, for example. Movement of the shaft 94 causes the ball portion 62 and, therefore, the reflector 24 to move in a generally horizontal plane. Accordingly, the center line 100 of the headlight aim moves according to the direction arrows 106 and 108, respectively.

Figure 6:
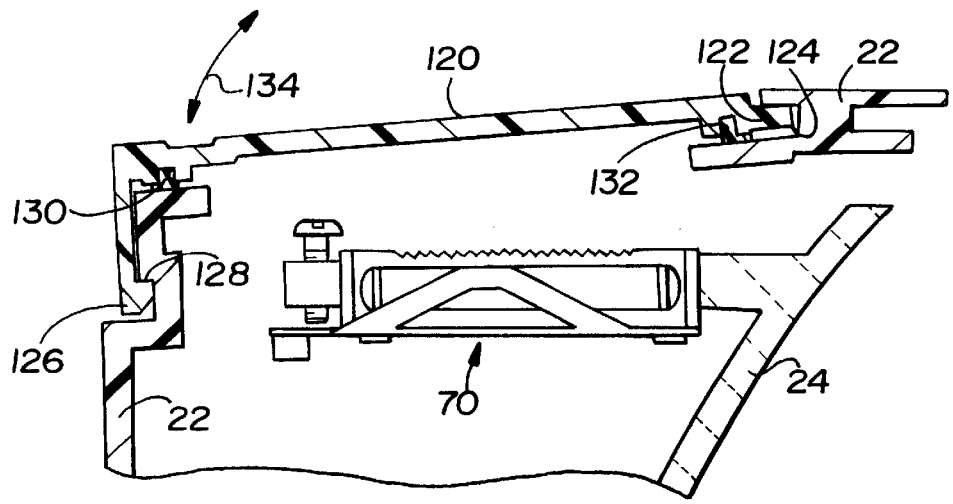
FIG. 6 is a partial, cross-sectional view of another feature of a headlamp assembly designed according to this invention.

As seen in FIGS. 1, 2 and 6, the bubble level 70, which is connected to the primary reflector 24, provides an indication of the angular orientation of the center line 100 of the headlamp aim. FIG. 6 illustrates a snapping level cover 120 that includes a tab member 122 that is received within a groove 124 on the housing 22. A snapping engagement member 126 abuts an engagement surface 128 on the housing 122. The placement of the tab member 122 within the groove 124 and the engagement between the snapping member 126 and the surface 128 ensure that the cover 120 does not move in a vertical direction (according to the drawing). A pair of engagement members 130 and 132, which are formed on the housing 22, are nestingly received within corresponding notches in the cover 120 to ensure that the cover 120 does not move in a generally horizontal direction (according to the drawing). When a technician, for example, desires to view the level 70 to ensure proper headlamp aim, the engaging member 126 is pulled generally away from the housing 22 and the entire cover 120 is moved according to the direction arrow 134. To replace the cover 120, the tab 122 is inserted within the groove 124 and the cover 120 is moved in a generally arcuate direction (according to arrow 134) until the snapping engagement member 126 appropriately snaps into position against the engagement surface 128.

Figure 7:
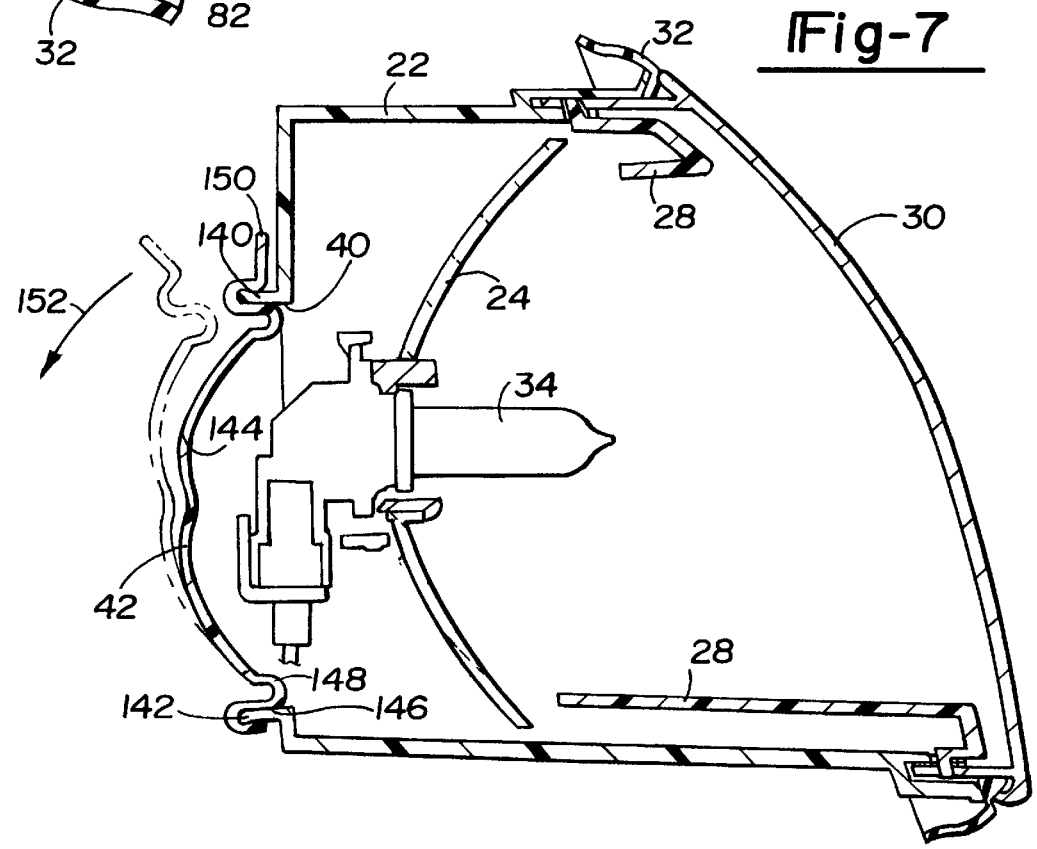
FIG. 7 is a cross-sectional view of another feature of a headlamp assembly designed according to this invention.

Referring now to FIG. 7, another feature of this invention will be described. The caps 42 close off the openings 40 after the headlight assembly has been completed. The housing 22 includes projections 140 and 142 that extend generally outward and away from the rear portion of the housing 22. The caps 42 include a generally arcuate portion 144 that extends across the opening 40. At each end of the generally arcuate portion 144 is an engagement surface 146. The engagement surface 146 is biased against the extensions 140 and 142 because of the curvilinear lip portion 148. The caps 42 preferably are made from an elastomeric material. Accordingly, the configuration of the curvilinear lip portions 148 provides a bias of the engagement surface 146 against the extensions on the housing 22.

Any exterior force on the arcuate portion 144 caused by a fluid that is external to the housing 22 effectively forces the engagement surfaces 146 against the extensions on the housing, thereby enhancing the sealing characteristics provided by the caps 42. In the event that one of the caps needs to be removed to replace a bulb 34, for example, a tab portion 150 can be pulled in a generally arcuate direction (according to the arrow 152) away from the housing 22 to remove the cap 42. The caps 42 ensure a fluid-tight seal on the openings 40 of the housing 22 because any pressure on the caps 42, other than the schematically illustrated generally arcuate motion of the tab member 150, will effectively enhance the sealing characteristics of the caps rather than cause them to be removed from the housing 22.

Figure 8:
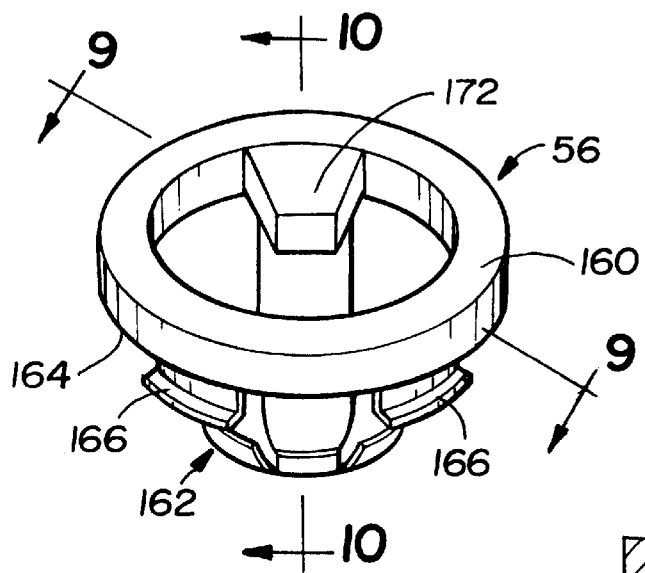
FIG. 8 is a perspective view of a retainer socket designed according to this invention.
Figure 9:
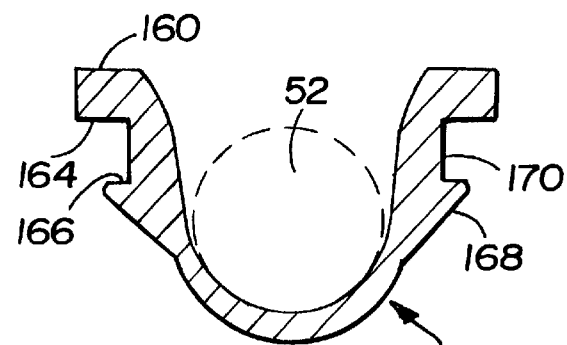
FIG. 9 is a cross-sectional view taken along the lines 9—9 in FIG. 8.

As mentioned above, the ball portions 52 and 62 of the adjustors 50 and 60 are respectively connected to the primary reflector 24. FIG. 8 illustrates a preferred embodiment of the socket retainer 56. The entire retainer 56 preferably is made of a generally resilient elastomer or plastic material. The retainer 56 snappingly engages the opening 58 on the primary reflector 24. The retainer 56 includes a generally annular ring portion 160. A basket portion 162 extends generally away from the ring portion 160. A flange on the reflector 24 that extends around the opening 58 is received between an engagement surface 164 on the ring portion 160 and engaging tabs 166 on the basket portion 162, respectively. Preferably, four engaging tabs 166 are equally circumferentially spaced around the basket portion 162 in diametrically opposed pairs. The engaging tabs 166 include generally ramped surfaces 168 (shown in FIG. 9) to facilitate moving the basket portion through the opening 58 until the flange on the reflector 24 is engaged within the neck portion 170 on the retainer 56.

The ball portion 52 is snappingly received within the retainer 56 by moving the ball portion through the opening defined by the ring portion 160. A plurality of retaining tab members 172 protrude generally inward within the basket portion 162. In the preferred embodiment, four retaining tabs 172 are equally circumferentially spaced intermittent with the tabs 166. As the ball portion is pushed into the retainer, the retaining tab members 172 flex in a generally radial direction to allow the ball portion 52 to be received within the basket portion 162. After the ball portion has protruded past the retaining tab members 172 they return to a position where they prevent the ball portion 52 from undesirably exiting the basket portion 162.

Figure 10:
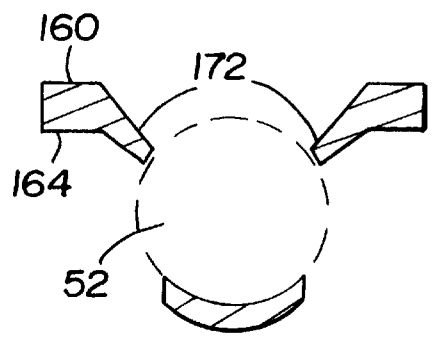
FIG. 10 is a cross-sectional view taken along the lines 10—10 in FIG. 8.

The ball portion 52 is illustrated in phantom in a received and engaged position in FIG. 10, for example. Accordingly, the resilient engaging tabs 166 and the resilient retaining tab members 172 on the retainer 56 provide a simple, snapping engagement between the ball portion 52 and the opening 58 on the reflector 24. A ball and socket joint is, therefore, provided that facilitates adjusting the position of the reflector 24 within the housing 22. The description of the retainer 56 applies equally to the retainer 66.

Figure 11:
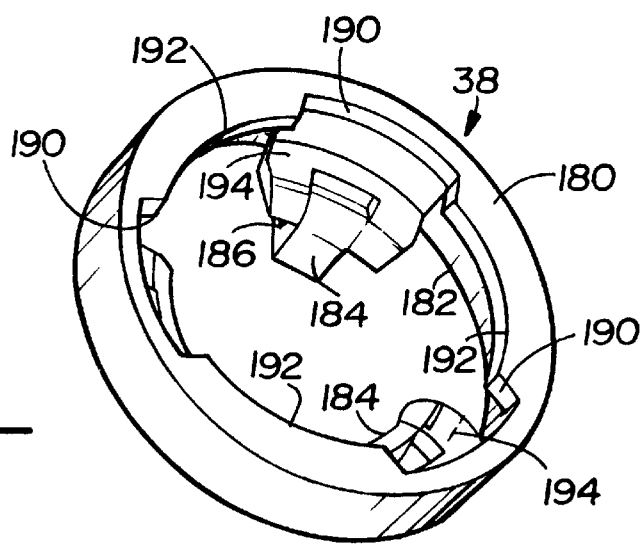
FIG. 11 is a perspective view of a bulb retainer designed according to this invention.

An efficient snapping arrangement also preferably is provided for supporting the bulbs 34 on the reflector 24. FIG. 11 illustrates a bulb retainer designed according to this invention. The bulb retainer 38 includes a generally annular ring portion 180. A bottom edge 182 on the ring portion 180 is received against a rear side of the reflector 24. Engaging tab members 184 include an engagement surface 186 that abuts a front surface on the reflector 24. This arrangement is generally illustrated in FIG. 4, for example. As can be appreciated from the drawings, the engaging tab members 184 include a ramped surface that facilitates moving the bulb retainer 38 through the openings 36 in the reflector 24.

The ring portion 180 also includes a plurality of slots 190 that are intermittently spaced with tab portions 192. The bulbs 34 preferably include tabs that are received axially through the slots 190 during an assembly process, for example. The bulb can then be turned so that the tabs on the bulb are tucked beneath the tabs 192 on the ring portion 180. The bulb is then axially aligned within the retainer 38. Abutment surfaces 194 are provided for preventing the bulbs from being pushed too far through the retainers 38. In the preferred embodiment, the bulbs 34 include a base portion 188 that abuttingly engages the engagement tab members 184 and biases them in a generally radially outward direction. The tab members 184 are, therefore, biased into a more solid engagement with the reflector 24. This provides significant advantages in maintaining the position of the bulbs supported on the reflector 24.

The various features of this invention, including the snapping engagement of the bezel to the housing and the lens, the snapping engagement between the ball socket retainer and the reflector, and the snapping engagement between the bulb retainer and the reflector each provide significant advantages compared to other headlamp assemblies. The snapping engagements facilitate economical and relatively simple assembly of a headlamp designed according to this invention.

The foregoing description is exemplary rather than limiting in nature. Variations and modifications to the disclosed embodiment will become apparent to those skilled in the art that do not necessarily depart from the purview and spirit of this invention. Accordingly, the scope of the legal protection accorded to this invention can only be determined by studying the following claims.

What is claimed is:

1. A vehicle headlamp assembly, comprising:
    a reflector having a front surface and a rear surface and a central opening through said reflector;
    a light bulb retainer that is received in said reflector opening, said retainer including a ring portion and a plurality of engaging tab members extending generally axially away from said ring portion, said ring portion abutting said reflector rear surface adjacent said reflector opening, said engaging tab members abutting said reflector front surface adjacent said reflector opening when said retainer snappingly engages said reflector, said ring portion including a plurality of circumferentially spaced slot portions and intermittent tab portions; and a light bulb having a base that is selectively received within said retainer, said bulb base including a corresponding plurality of tab extensions that are received axially through said slot portions as said bulb base is inserted into said retainer and wherein said bulb base is maintained in a fixed axial position within said retainer by said tab portions when said base is appropriately positioned within said retainer, and wherein said base biases said engaging tab members into abutting engagement with said reflector when said bulb is positioned within said retainer.

2. The assembly of claim 1, wherein said retainer is made from a plastic material.

3. The assembly of claim 1, wherein said retainer engaging tab members each include a ramped surface that is sloped generally radially inward in a direction away from said ring portion, said ramped surfaces facilitating insertion of said retainer into said reflector opening so that said ring portion and said engaging tab members snappingly engage said rear and front surfaces of said reflector, respectively.

4. The assembly of claim 3, wherein said engaging tab members each include a first portion extending generally radially inward from said ring portion, a second portion extending axially from said first portion in a direction generally away from said ring portion and a third portion extending generally radially outward from said second portion, said third portion including an abutment surface that engages said front surface on said reflector.

5. The assembly of claim 1, further comprising:
a housing having a rear portion and a front portion with a channel including two side walls and extending along a portion of a peripheral edge on said front portion;
a bezel received within said housing and having a tab member that engages one of said channel sidewalls on said housing; and
a lens having a flange portion that is at least partially received within said housing channel and said bezel tab member engages said flange portion to maintain said flange portion within said channel and wherein said reflector supported within said assembly between said housing and said lens.

6. The assembly of claim 5, wherein one of said channel sidewalls includes an opening, said bezel tab member includes a finger portion that is received within said opening and wherein said lens flange portion includes an opening and said finger portion is received within said flange portion opening.

7. The assembly of claim 5, further comprising an actuator having a first portion supported on an outside of said housing and a second portion extending from said first portion into an interior of said assembly, said actuator second portion being movable relative to said first portion, said actuator second portion being coupled to said reflector such that said reflector is movably supported within said assembly by said actuator second portion, and wherein said actuator second portion comprises a shaft with a generally spherical distal end and further comprising a snapping receiver socket that is snappingly received within an opening on said reflector, said generally spherical distal end being snappingly and nestingly received within said receiver socket such that said reflector is supported by said actuator second portion.

8. The assembly of claim 7, wherein said receiver socket comprises a ring portion and a basket portion extending generally axially away from said ring portion, said basket portion being partially received in said opening in said reflector, said basket portion including a plurality of engaging tab members extending generally radially away from an outer periphery of said basket portion, said ring portion having an abutment surface facing said engaging tab members, said receiver socket further including a necked portion extending between said abutment surface and said engaging tab members, said receiver snappingly engaging a surface on said reflector adjacent said opening such that said necked portion is maintained within said reflector opening between said abutment surface and said engaging tab members.

9. The assembly of claim 1, wherein said retainer ring portion and engaging members are integrally formed as a single-piece structure.

10. A vehicle headlamp assembly, comprising:
a reflector having a front surface and a rear surface and an opening through said reflector;
a bulb retainer that is received in said reflector opening, said retainer including a ring portion and a plurality of engaging tab members extending generally axially away from said ring portion, said tab members and said ring portion being integrally formed from a single piece of material, said ring portion abutting said reflector rear surface adjacent said reflector opening, said ring portion including a plurality of circumferentially spaced slot portions and intermittent tab portions, said engaging tab members abutting said reflector front surface adjacent said reflector opening when said retainer snappingly engages said reflector; and
a light bulb having a base that includes a plurality of tab extensions that are received axially through said ring portion slot portions so that said bulb base is selectively received within said retainer, said bulb base being maintained in a fixed axial position within said retainer by said tab portions when said base is appropriately positioned within said retainer.

11. The assembly of claim 10, wherein said retainer is made from a plastic material.

12. The assembly of claim 10, wherein said bulb base includes an engagement portion that abuttingly engages said engaging tab members, said bulb base engagement portion having an outside diameter that is large enough to bias said engaging tabs into engagement with said reflector.

* * * * *